UNITED STATES PATENT OFFICE.

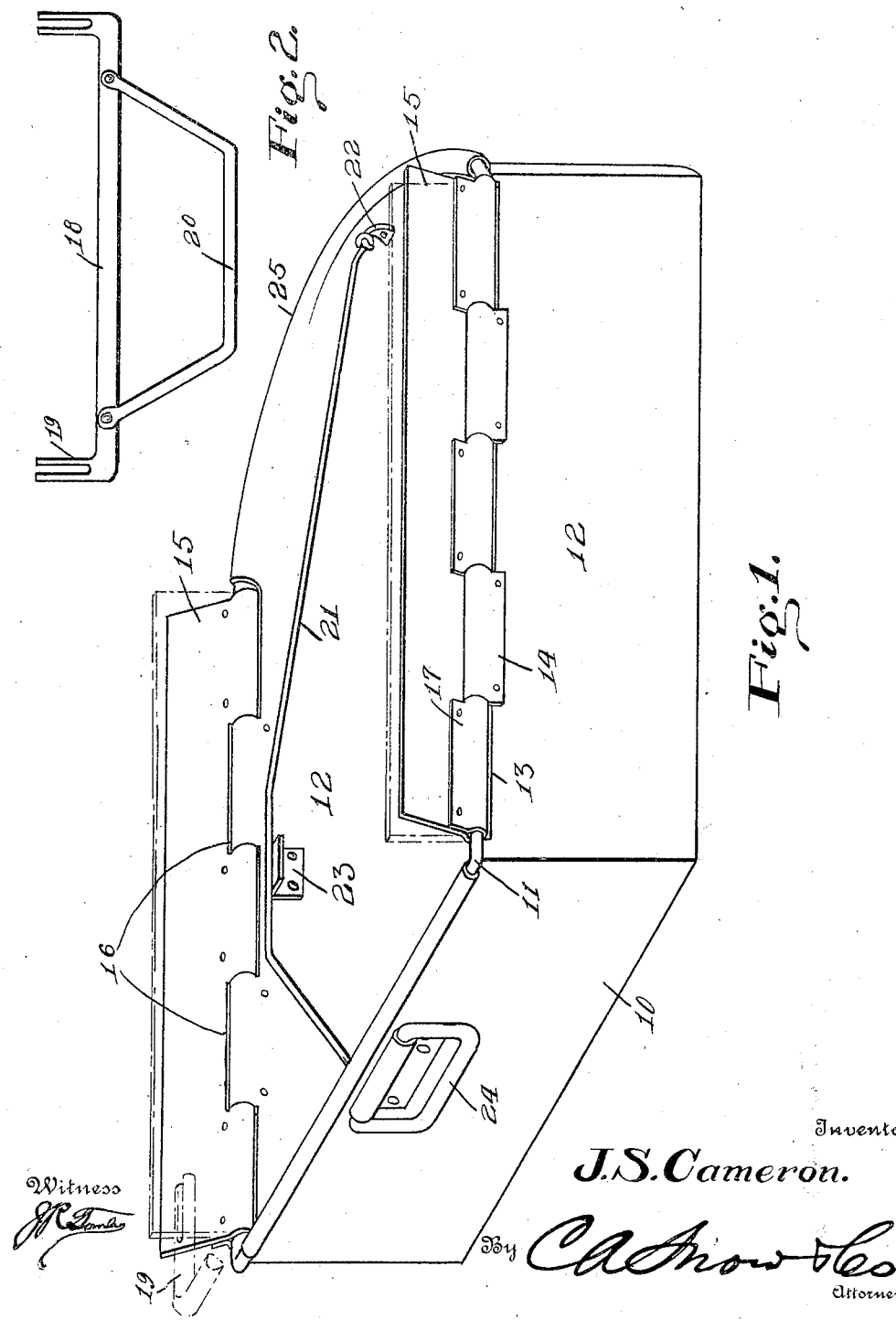

JOHN S. CAMERON, OF ELLIOTT, ILLINOIS.

ASH-PAN.

1,377,463. Specification of Letters Patent. Patented May 10, 1921.

Application filed April 8, 1920. Serial No. 372,246.

*To all whom it may concern:*

Be it known that I, JOHN S. CAMERON, a citizen of the United States, residing at Elliott, in the county of Ford and State of Illinois, have invented a new and useful Ash-Pan, of which the following is a specification.

The present invention relates to new and useful improvements in ash pan construction, and it is the primary object of the invention to provide novel means forming a part of the ash pan proper, for directing the ashes from the fire-box associated with the pan, to the central portion of the pan, thus guarding against the ashes being deposited between the sides of the pan and the walls of the ash pit, in which the pan is supported.

A further object of the invention is to provide a device of the character described including hinged plates together, with means for supporting the plates in a vertical position, to facilitate the positioning of the pan.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a perspective view of a pan constructed in accordance with the present invention.

Fig. 2 illustrates the supporting device employed in connection with the hinged plates of the pan.

Referring to the drawing in detail, the pan is indicated by the reference character 10, which is formed preferably of sheet metal, having the upper edges thereof turned over the bracing iron 11 to brace the upper portion of the pan.

The side walls of the pan indicated at 12, have portions thereof cut away as at 13 to provide clearances, for purposes to be hereinafter more fully described, the portions 14 between the cut out portions 13 providing means for securing the side walls of the pan to the iron 11.

Supported at the upper edges of the side walls 12, are the hinged plates 15, each of which is of a length equal to the length of the pan proper, and is provided with cut out portions 16 providing clearances for the portions 14 of the side walls 12, while the portions of the plates 15 indicated at 17 embrace portions of the iron 11 to provide hinges for the plates 15 to permit the same to swing with relation to the walls 12.

In order that these plates 15 may be supported in a vertical position to permit the pan to be inserted or positioned in an ash pit, a supporting member 18 is provided, which supporting member includes right angled end portions indicated at 19 which are forked to permit the right angled ends of the supporting member to be positioned over the edges of the plates 15 to connect the plates.

A handle portion 20 has connection with the supporting member 18 and provides means whereby the supporting member may be readily and easily applied or removed from the plates 15.

Forming a part of the pan is a handle 21, which has its ends connected to the inner surfaces of the end walls of the pan as at 22, and by means of this handle it is obvious that the pan may be carried to a place where the contents thereof may be readily discharged. A bracket member 23 is secured to the inner surface of one of the side walls of the pan, and lies within the path of travel of the handle 21, when the same is swung downwardly to a horizontal position, or in a position wherein the pan may be inserted in the ash pit.

Secured to the outer surface of the front wall of the pan is a handle 24, by means of which the pan may be readily moved from its location within the ash pit.

It might be further stated that the rear end of the pan 10 is curved as at 25 to conform to the curved inner wall of the ash pit to which the pan is to be applied, but it is to be understood that while I have shown the rear wall curved, the pan is to be made in any desirable design to conform to a particular ash pit.

In the use of the device, the hinged plates 15 are moved to vertical positions and supported in such position by means of the supporting member 18, the plates being shown in such vertical positions by dotted lines in Fig. 1, whereupon the pan may be positioned within an ash pit. When the pan has been properly positioned, the supporting member 18 is removed, with the result that the pans hinge outwardly and rest on the side walls of the ash pit, presenting inclined surfaces for directing the ashes which fall from the fire-box, to the central portion of the pan proper, and eliminating any possibility of the ashes being deposited between the walls of the ash pit and walls of the pan.

Having thus described the invention, what I claim as new is:—

In an ash pan, a body portion, doors forming a part of the ash pan, a supporting member having right angled extremities, the right angled extremities having slotted portions to provide gripping fingers, said gripping fingers adapted to grip the doors, and a handle section including a bar having its ends secured to the supporting member and having a portion thereof disposed in spaced relation with the supporting member.

In testimony that I claim the foregoing as my own, I have hereto affixed my signature in the presence of two witnesses.

JOHN S. CAMERON.

Witnesses:
P. K. DAHL,
GEO. O. FOSSEL.